United States Patent [19]

Cruze

[11] Patent Number: 5,501,977
[45] Date of Patent: Mar. 26, 1996

[54] BIOFILTER COMPRISING LEONARDITE, CLAY AND LIME

[75] Inventor: John A. Cruze, Bartlesville, Okla.

[73] Assignee: Phillips Petroleum Company, Bartlesville, Okla.

[21] Appl. No.: 271,601

[22] Filed: Jul. 7, 1994

Related U.S. Application Data

[62] Division of Ser. No. 72,025, Jun. 7, 1993, Pat. No. 5,378,280.

[51] Int. Cl.$^6$ .......................... B01D 53/54; B01D 53/72; B01D 53/84
[52] U.S. Cl. ...................... 435/266; 435/262; 423/213.2; 423/245.1; 502/401
[58] Field of Search .................................. 435/262, 266; 423/213.2, 245.1; 502/401

[56] References Cited

U.S. PATENT DOCUMENTS

| | | | |
|---|---|---|---|
| 3,994,738 | 11/1976 | Visser | 106/55 |
| 4,033,893 | 7/1977 | Mondshine | 252/8.5 A |
| 4,678,591 | 7/1987 | Giddings et al. | 252/8.514 |
| 4,842,770 | 6/1989 | Patel | 252/8.514 |
| 5,030,365 | 7/1991 | Christensen et al. | 252/8.515 |
| 5,378,280 | 1/1995 | Cruze | 106/793 |

OTHER PUBLICATIONS

Rehm et al, *Biotechnology*, vol. 8, VCH, Weinheim Federal Republic of Germany, (1986) pp. 427–450.

Bohr, H. "Consider Biofiltration for Decontaminating Gases" *Chemical Engineering Progress* (Apr. 1992) pp. 34–40.

Brauer, H. "Biological purification of waste gases" *International Chemical Engineering*. vol. 26, No. 3, (Jul. 1986) pp. 387–395.

Dharmavaram (Air & Waste Management Association 84th Annual Meeting & Exhibition, Jun. 16–21, 1991) Biofiltration A Lean Emissions Abatement Technology, pp. 2–15.

Miller et al—(Environmental Progress, vol. 10, No. 4, Nov. 1991) Control of Aromatic Waste Air Stream by Soil Bioreactors, pp. 300–306.

*Primary Examiner*—Michael G. Wityshyn
*Assistant Examiner*—Timothy J. Reardon
*Attorney, Agent, or Firm*—Lucas K. Shay

[57] ABSTRACT

A biofilter composition of leonardite, clay, lime, and an inorganic salt mixture and a process for controlling air quality by contacting an air stream with the biofilter composition are provided wherein the composition supports microbial growth. The inorganic salt mixture comprises a nitrogen source and a phosphorus source. The air stream generally contains at least one volatile organic compound.

32 Claims, No Drawings

5,501,977

BIOFILTER COMPRISING LEONARDITE, CLAY AND LIME

This application is a division of application Ser. No. 08/072,025, filed Jun. 7, 1993, now U.S. Pat. No. 5,378,280.

FIELD OF THE INVENTION

The present invention relates to a composition which comprises leonardite, clay and lime and a process for using the composition for industrial applications.

BACKGROUND OF THE INVENTION

One of the technologies for controlling air quality is the use of biofilters. Biofilters have been used for many years as a means of odor control for such installations as rendering plants and sewage treatment plants. In the past ten years, biofilters have been used as a way of controlling low concentration hydrocarbon emissions from a growing list of industries. Biofilters are getting increased attention as a possible means of dealing with low concentration hydrocarbon emissions in non-attainment areas.

Biofilters in use today are of two distinctly different types. The oldest and least efficient is the soil biofilter which is also likely the most economical to install. It consists of a soil bed which covers a distribution piping network to a depth less than three feet. Due to low soil porosity, the bed must be quite large to avoid excessive back pressure on the gas stream and to provide sufficient area to remediate the vapors. The size of these beds makes it quite expensive to place a roof over them to enable the direct measurement of emission rates. Remediation rates of one to ten kilograms per square meter of surface area per year are reported for such filter beds which are reported to operate indefinitely. The other form of biofilter is the compost filter which generally seems to be constructed of bark or sphagnum moss along with a number of different additives to improve the performance. Remediation rates with compost filters are generally reported as being between ten and one hundred grams per cubic meter of filter media per hour. While the compost beds provide a dramatic increase in performance over the soil beds, they are consumed by the remediation process and must be replenished or replaced every six months to five years. As a result of these limitations, neither type is considered particularly suitable for a variety of industrial uses such as, for example, in petroleum refining operations. Therefore, there is a need to develop still more effective biofilters and biofiltration processes for controlling air quality.

SUMMARY OF THE INVENTION

An object of the invention is to provide a composition suitable for use in biofilters. Another object of the invention is to provide a process for using the composition. Still another object of the invention is to provide a process for controlling air quality. An advantage of the invention is the high efficiency of removing organic material in the air stream. Other objects, advantages, and features will become more apparent as the invention is more fully disclosed hereinbelow.

According to a first embodiment of the present invention, a composition is provided which comprises leonardite, clay, lime and an inorganic salt mixture wherein the inorganic salt mixture comprises a nitrogen source and a phosphorus source for microbial growth.

According to a second embodiment of the present invention, a process for controlling air quality is provided which comprises contacting an air stream with a composition which comprises leonardite, clay, lime, an inorganic salt mixture, and water wherein the inorganic salt mixture comprises nitrogen source and phosphorus source.

DETAILED DESCRIPTION OF THE INVENTION

According to the first embodiment of the invention, the leonardite is an oxidized form of lignite coal. Leonardite is found in the overburden covering lignite coal deposits at depths not exceeding twenty feet from the surface. It is highly oxidized and unsuitable for use as a fuel. Leonardite as mined generally has an extensive microbial population.

The clay useful as a component of the invention can be any kind of clay. Examples of suitable clays include, but are not limited to, kaolinite, halloysite, vermiculite, chlorite, attapulgite, smectite, montmorillonite, illite, saconite, sepiolite, palygorskite, Fuller's earth, and mixtures thereof. The presently preferred clay is a montmorillonite clay. The presently most preferred clay is sodium montmorillonite which is generally known as bentonite.

According to the present invention, the lime can be specifically calcium oxide, or more generally any of the various chemical and physical forms of quicklime, lime citrate, chlorinated lime, fat lime, lean lime, lime hypophosphite, lime-nitrogen, lime saltpeter, limestone, hydrated lime, sulfurated lime, lime water, hydraulic lime, and mixtures thereof. For example, lime slaked with water to form calcium hydroxide; lime slaked with carbon dioxide and moisture to form a powder consisting of calcium carbonate and calcium hydroxide; lime associated with magnesia; lime-sulfur solution made by boiling lime, sulfur and water; are generally suitable for use in the invention. The presently preferred limes are calcium oxide and calcium hydroxide.

According to the present invention, the inorganic mixture comprises a nitrogen source and a phosphorus source. The nitrogen source is generally an ammonium salt, a metal nitrate salt, or both. Examples of suitable nitrogen sources are, but are not limited to, ammonium nitrate, ammonium chloride, ammonium sulfate, sodium nitrate, potassium nitrate, magnesium nitrate, and mixtures thereof. The presently preferred nitrogen source is ammonium nitrate because of its low cost and ready availability. The inorganic mixture can also contain a potassium source. The potassium source is generally a potassium salt such as, for example, potassium phosphate (dibasic), potassium phosphate (monobasic), potassium sulfate, potassium nitrate, potassium bicarbonate, potassium carbonate, potassium hydroxide, and mixtures thereof. The presently preferred potassium sources are potassium phosphate, monobasic or dibasic, because of their buffering capacity and because they also supply the required phosphorus source. The phosphorus source can be an inorganic or organic phosphorus-containing compound. Examples of suitable phosphorus sources include, but are not limited to, potassium phosphate (monobasic), potassium phosphate (dibasic), ammonium phosphates, sodium phosphates, phosphoric acid, and mixtures thereof. The presently preferred phosphorus sources are potassium phosphate (monobasic) and potassium phosphate (dibasic) only because of their low cost and availability. The molar ratio of the phosphorus source to the nitrogen source is in the range of from about 0.001:1 to about 10:1, preferably 0.01:1 to 5:1.

Based on the total weight of the composition equaling 100%, the weight % of the leonardite is in the range of from about 30% to about 90%, preferably about 40% to about 80%, and most preferably 50% to 60%. The weight % of the clay is generally in the range of from about 2% to about 40%, preferably about 5% to about 35%, and most preferably about 8% to 30%. The weight % of lime is generally in the range of from about 0.01% to about 20%, preferably about 0.1% to about 10%, and most preferably 2% to 6%. The weight % of the inorganic salt mixture can vary from about 0.0001% to about 5%, preferably about 0.001% to about 3%, and most preferably 0.01% to 1%. Water is present in the composition in the range of from about 10% to about 40%, preferably about 15% to about 35% and most preferably 20% to 30%. All weight % disclosed is based on the total weight % of the composition being equal to 100%.

The composition of the invention can be prepared by simply mixing the individual components by any known mixing means such as mechanical mixing with a blender. For example, leonardite and clay can be first blended in a blender to form a dry mixture. The dry mixture is further thoroughly mixed with lime followed by addition of the inorganic mixture, if present. Optionally, water can then be added to the mixture to form a hydrated composition. Alternatively, the inorganic mixture can be dissolved in water to form a solution or suspension before it is added to the dry mixture to form a hydrated composition.

The composition can be adjusted to a desirable pH by the amount of lime present in the composition.

According to the second embodiment of the invention, a process for controlling air quality of an air stream is provided. The process comprises contacting the air stream with a composition comprising leonardite, clay, lime, an inorganic mixture, and water. The composition is the same as the optional composition disclosed in the first embodiment of the invention and is not repeated for the interest of brevity.

Different physical forms of the hydrated composition disclosed above can be made manually such as, for example, by hand; or by mechanical means such as, for example, extrusion or pellet milling. Examples of physical forms of the composition can include, but are not limited to, spheres, cubes, granules, pellets, and mixtures thereof. The presently preferred physical form is sphere because it allows higher air velocity, when packed in a biofilter, facilitating the passage of air streams.

The composition can then be packed into a biofilter to be used as filter bed. The term "biofilter" used herein is generically referred to, unless otherwise indicated, a well-known device consisting of a filter bed through which an air stream, generally containing undesirable organic compounds, passes. The size of the filter bed depends on the size of the device, the length of time to be used, the concentration of volatile organic compounds to be biodegraded, the efficiency requirements of removing the volatile organic compounds, and biodegradation rates. See generally S. Dharmavarson, "Biofiltration—A Lean Emissions Abatement Technology" Air & Waste Management Associated Annual Meeting, Vancouver, B.C., Jun. 16–21, 1991. Any device equipped with an air inlet and outlet can be used as a biofilter vessel. The choice of a suitable device is a matter of preference to one skilled in the art. Examples of suitable device are concrete, metal, glass, or fiberglass tanks, boxes, and pipes constructed above ground or in-ground. The presently preferred device is cylindrical, above ground, tanks.

After the device is packed with the composition of the invention for use as filter bed, according to the second embodiment of the invention, the filter bed is contacted with an air stream contaminated with organic chemicals, generally by mechanical means such as, for example, an air blower fan or air compressor. Microorganisms present in the clay and/or leonardite of the invention composition quickly utilize the organic chemicals as substrate for growth so that the air leaving the biofilter becomes decontaminated. Examples of suitable organic chemicals include, but are not limited to, hydrocarbons, alcohols, aldehydes, mercaptans, acids, ketones, sulfides, ethers, and mixtures thereof, as long as the chemicals are volatile and can be carried into the biofilters.

The process of the invention can be carried out at a wide range of temperatures that are suitable for microbial growth, generally from about 5° C. to about 70° C., preferably about 10° C. to about 60° C., and most preferably 15° C. to 55° C. The process can be carried out under a pressure in the range of from about 0.5 to about 5 atmospheres and preferably under atmospheric pressure.

The off-gas can be vented to the atmosphere. Alternatively, the off-gas can be secondary volatile organic compound-devices such as, for example, activated carbon beds, for backup emission control. Disposal of bed material requires the passage of air through the biofilter so that the microorganisms consume all adsorbed volatile organic compounds. Once all of the contaminants are consumed, the bed material may be land-filled.

The following examples are intended to further illustrate the present invention and are not intended to limit the scope of the invention.

EXAMPLE I

Dry power of leonardite (400 g), bentonite (100 g), calcium hydroxide (30 g), ammonium nitrate (5 g), potassium dihydrogen phosphate (1 g), and potassium hydrogen phosphate (1 g) were thoroughly mixed in a pan by hand with a spoon until it was homogeneous. Water (200 g) was added to the homogeneously mixed dry powder with contemporaneous mixing to result in a black paste having a dough-like consistency. Spheres of the paste between 10 to 20 mm in diameter were constructed by mechanical means. After curing in the air for about 16 hours (overnight), the spheres became hard and non-pliable. A biofilter bed was constructed by filling a glass cylinder 10 cm in diameter to a bed depth of 1 meter with the cured spheres.

A 500 ml/min humidified air stream was introduced into the bottom of the biofilter bed. Gasoline was continuously injected into the humidified air stream at a rate of 1.4 grams/m$^3$/hr with a syringe pump. After two weeks of exposure to gasoline vapors, visible colonies of microorganisms were visibly apparent on the surface of the spheres.

Inlet and effluent gasoline concentrations in the air stream were monitored daily with a gas chromatograph (GC) equipped with an FID detector. GC results showed that the inlet gasoline concentration was, on the average, 0.36 mg/l and the effluent gasoline concentration was 0.0152 mg/l. Also determined was benzene concentrations in the inlet and effluent air streams. It was found that the inlet benzene concentration was 0.004 mg/l and the effluent air stream contained less than 0.00001 mg/l of benzene. These results show that the biofilter removed 95.8% of gasoline and essentially all benzene contained in the air stream.

The biofilter has operated for more than a year with no loss of operating efficiency, no nutrients added, no pressure buildup, no inoculation of microorganisms, and no addition of filter bed material during this period.

EXAMPLE II

A biofilter was constructed of a bed of leonardite spheres of the following composition:

| | |
|---|---|
| 400 grams | dry leonardite |
| 100 grams | bentonite |
| 20 grams | calcium hydroxide |
| 5 grams | ammonium nitrate |
| 1 gram | potassium dihydrogen phosphate |
| 1 gram | potassium hydrogen phosphate |
| 200 grams | water |

The dry powder was thoroughly mixed until it was homogeneous before water was added. The amount of water added was sufficient to result in a black paste having a dough-like consistency. Spheres of the paste between 10 and 20 mm in diameter were constructed by mechanical means. After overnight curing, the spheres became hard and non-pliable. A biofilter bed was constructed by filling a glass cylinder 10 cm in diameter to a bed depth of 1 meter with the cured spheres. No inoculation of microorganisms was necessary. A 500 ml/min humidified air stream was introduced into the bottom of the bed. A mixture of n-heptane, benzene, toluene, ethylbenzene, and o-xylene was introduced into the airstream at a constant rate with a syringe pump. After 2 weeks of exposure to hydrocarbon vapors, visible colonies of microorganisms were apparent on the surface of the leonardite spheres. The operating parameters were:

Bed Volume=8 liters

Bed Height=1 meter

Air Flow=0.5 liters/minute

Hydrocarbon Feed Rate=9.3 g/m$^3$/hr

Temperature=Ambient

The results are shown in the following table.

| Hydrocarbon | Mass Ratio | Inlet mg/l | Effluent mg/l | Efficiency % |
|---|---|---|---|---|
| N-heptane | 40 | 0.995 | 0.0002 | 99.98 |
| Benzene | 15 | 0.373 | <0.0001 | >99.98 |
| Toluene | 15 | 0.373 | <0.0001 | >99.98 |
| Ethylbenzene | 15 | 0.373 | <0.0001 | >99.98 |
| o-Xylene | 15 | 0.373 | 0.0003 | 99.92 |

The biofilter has operated for 11 months with no loss of operating efficiency, no nutrients added, no pressure buildup, no inoculation of microorganisms, and no addition of bed material.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process for decontaminating a contaminated air stream with a biofilter comprising contacting an air stream, contaminated with at least one volatile compound, with a biofilter composition wherein said biofilter composition comprises leonardite, clay, lime, and an inorganic salt mixture, each of which is present in an amount sufficient to support the growth of at least one microorganism suitable to degrade said at least one volatile compound, and said contacting occurring for a time and under conditions sufficient for said at least one microorganism to decade said at least one volatile compound.

2. The process according to claim 1 wherein said biofilter composition further comprises water in an amount sufficient to support the growth of said at least one microorganism.

3. The process according to claim 2 wherein the weight % of water is in the range of from about 10% to about 40% of the total weight of said biofilter composition.

4. The process according to claim 2 wherein the weight % of water is in the range of from 20% to 30% of the total weight of said biofilter composition.

5. The process according to claim 1 wherein said inorganic salt mixture comprises a nitrogen source and a phosphorus source in amounts sufficient to support the growth of said at least one microorganism.

6. The process according to claim 5 wherein said nitrogen source is selected from the group consisting of an ammonium salt, a metal nitrate salt, and mixtures thereof.

7. The process according to claim 5 wherein said nitrogen source is ammonium nitrate.

8. The process according to claim 5 wherein said phosphorus source is selected from the group consisting of an inorganic phosphorus-containing compound, an organic phosphorus-containing compound, and mixtures thereof.

9. The process according to claim 8 wherein said inorganic phosphorus-containing compound is selected from the group consisting of monobasic potassium phosphate, dibasic potassium phosphate and mixtures thereof.

10. The process according to claim 5 wherein said phosphorus source is selected from the group consisting of monobasic potassium phosphate, dibasic potassium phosphate, and mixtures thereof.

11. The process according to claim 5 wherein the molar ratio of said phosphorus source to said nitrogen source is in the range of from about 0.001:1 to about 10:1.

12. The process according to claim 11 wherein the molar ratio of said phosphorus source to said nitrogen source is in the range of from 0,01:1 to 5:1.

13. The process according to claim 1 wherein said clay is selected from the group consisting of kaolinite, halloysite, vermiculite, chlorite, attapulgite, smectite, montmorillonite, illite, saconite, sepiolite, palygorskite, Fuller's earth, and mixtures thereof.

14. The process to claim 1 wherein said clay is bentonite.

15. The process according to claim 1 wherein said inorganic salt mixture comprises a potassium source which is a potassium salt.

16. The process according to claim 1 wherein said lime is selected from the group consisting of quicklime, lime citrate, chlorinated lime, fat lime, lean lime, lime hypophosphite, lime-nitrogen, lime saltpeter, limestone, hydrated lime, sulfurated lime, lime water, hydraulic lime, and mixtures thereof.

17. The process according to claim 1 wherein said lime is selected from the group consisting of calcium oxide and calcium hydroxide.

18. The process according to claim 1 wherein the weight % of said leonardite is in the range of from about 30% to about 90% of the total weight of said biofilter composition.

19. The process according to claim I wherein the weight % of said leonardite is in the range of from about 40% to about 80% of the total weight of said biofilter composition.

20. The process according to claim 1 wherein the weight % of said clay is in the range of from about 2% to about 40% of the total weight of said biofilter composition.

21. The process according to claim 1 wherein the weight % of said clay is in the range of from 8% to 30% of the total weight of said biofilter composition.

22. The process according to claim 1 wherein the weight

% of said lime is in the range of from about 0.01% to about 20% of the total weight of said biofilter composition.

23. The process according to claim 1 wherein the weight % of said lime is in the range of from 2% to 6% of the total weight of said biofilter composition.

24. The process according to claim 1 wherein the weight % of said inorganic salt mixture is in the range of from about 0.0001% to about 5% of the total weight of said biofilter composition.

25. The process according to claim 1 wherein the weight % of said inorganic salt mixture is in the range of from 0.001% to 3% of the total weight of said biofilter composition.

26. The process according to claim 1 wherein the physical form of said composition is selected from the group consisting of spheres, cubes, granules, pellets, and mixtures thereof.

27. The process according to claim 26 wherein said physical form is spheres.

28. The process according to claim 1 wherein said leonardite is present in said composition in the range of from about 30 weight % to about 90 weight % of the total weight of said biofilter composition; said clay is present in said composition in the range of from about 2 weight % to about 40 weight %; said lime is present in said composition in the range of from about 0.01 weight % to about 20 weight %; and said inorganic salt mixture is present in said composition in the range of from about 0,0001 weight % to about 5 weight %.

29. A process for decontaminating a contaminated air stream with a biofilter comprising contacting an air stream, contaminated with at least one volatile compound, with a biofilter composition wherein said biofilter composition comprises leonaradite, clay, lime, and an inorganic salt mixture, each of which is present in an amount sufficient to support the growth of at least one microorganism suitable to degrade said at least one volatile compound; said contacting occurring for a time and under conditions sufficient for said at least one microorganism to degrade said at least one volatile compound, wherein said leonardite is present in said composition in the range of from about 30 weight % to about 90 weight % of the total weight of said biofilter composition; said clay is present in said composition in the range of from about 2 weight % to about 40 weight %; said lime is present in said composition in the range of from about 0.01 weight % to about 20 weight %; and said inorganic salt mixture is present in said composition in the range of from about 0.0001 weight % to about 5 weight %.

30. The process according to claim 29 wherein said composition further comprises water in an amount sufficient to support the growth of said at least one microorganism.

31. The process according to claim 29 wherein said at least one volatile compound in said contaminated air stream comprises a volatile organic chemical.

32. A process for decontaminating a contaminated air stream with a biofilter comprising contacting an air stream; contaminated with at least one volatile compound, with a biofilter composition wherein said biofilter composition comprises leonardite, clay, lime, an inorganic salt mixture, and water, each of which is present in an amount sufficient to support the growth of at least one microorganism suitable to degrade said at least one volatile compound, said contacting occurring for a time and under conditions sufficient for said at least one microorganism to degrade said at least one volatile compound; wherein said leonardite is present in said composition in the range of 50 weight % to 60 weight % of the total weight of said biofilter composition; said clay is present in said composition in the range of from 8 weight % to 30 weight %; said lime is present in said composition in the range of from 2 weight % to 6 weight %; and said inorganic salt mixture is present in said composition in the range of from 0.001 weight % to 3 it weight %; said inorganic salt mixture comprising a nitrogen source selected from the group consisting of an ammonium salt, a metal nitrate salt, and mixtures thereof and comprising a phosphorus source selected from the group consisting of monobasic potassium phosphate, dibasic potassium phosphate, and mixtures thereof, said inorganic salt mixtures having a molar ratio of phosphorus source:nitrogen source in the range of from 0.01:1 to 5:1; and said at least volatile compound in said contaminated air stream comprises an organic chemical selected from the group consisting of hydrocarbons, alcohols, aldehydes, mercaptans, acids, ketones, sulfides, ethers, and mixtures thereof.

* * * * *